Nov. 24, 1953 C. L. ELLIS ET AL 2,660,615

SIGNAL GENERATION APPARATUS

Filed April 11, 1951 3 Sheets-Sheet 1

Inventors:
Calvin L. Ellis,
Ralph W. Elsner,
by Merton D. Moore
Their Attorney.

Inventors:
Calvin L. Ellis,
Ralph W. Elsner,
by Merton D. Morse
Their Attorney.

Nov. 24, 1953 C. L. ELLIS ET AL 2,660,615

SIGNAL GENERATION APPARATUS

Filed April 11, 1951 3 Sheets-Sheet 3

Inventors:
Calvin L. Ellis,
Ralph W. Elsner,
by Merlon D. Moore
Their Attorney.

Patented Nov. 24, 1953

2,660,615

UNITED STATES PATENT OFFICE 2,660,615

SIGNAL GENERATION APPARATUS

Calvin L. Ellis, Clay, N. Y., and Ralph W. Elsner, Phoenix, Ariz., assignors to General Electric Company, a corporation of New York Application April 11, 1951, Serial No. 220,414

7 Claims. (Cl. 178—7.2)

Figure 2:
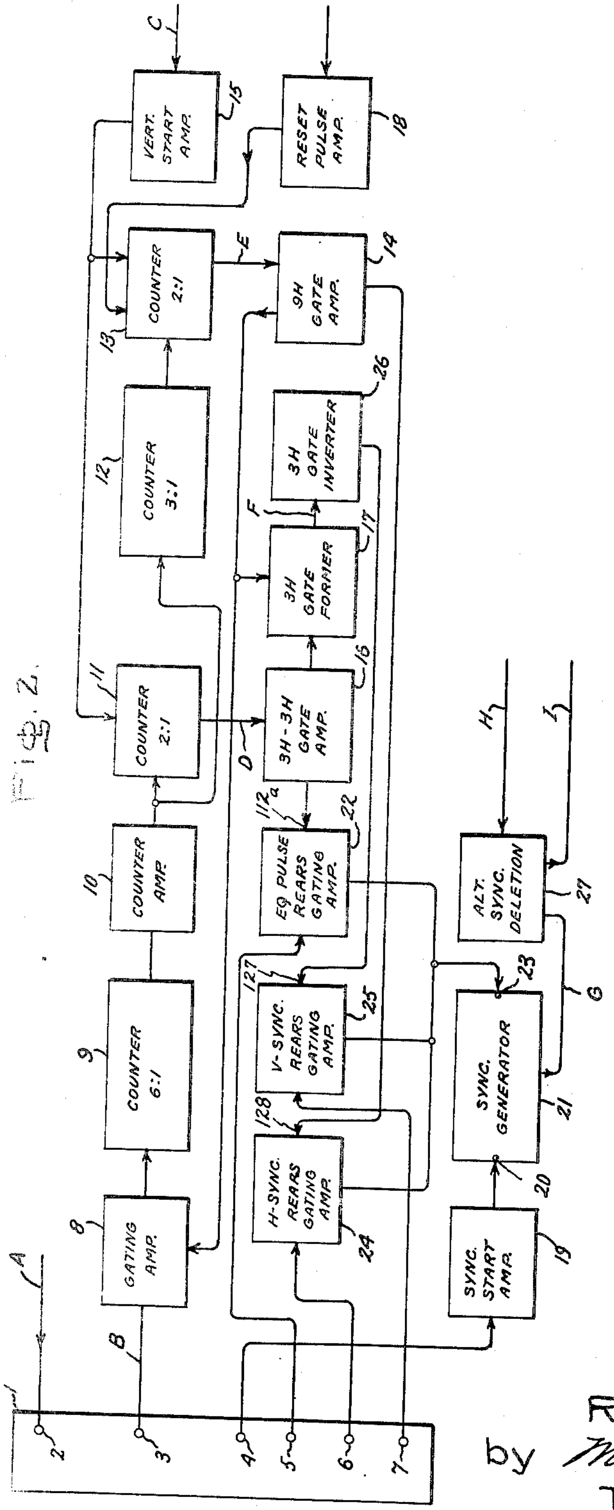

The present invention relates, in general, to the production of electrical signals and more particularly to apparatus for developing horizontal and vertical synchronizing and equalizing signals for television apparatus.

In television transmission systems electron beam type devices are used at the transmitter end and at the receiver end of the system for the scansion of the image to be televised and for its reproduction, respectively. In order to obtain a satisfactory reproduction of the televised image, it is essential that the horizontal and vertical motion of the electron beam at the receiver be accurately synchronized with the motion of the electron beam at the transmitter. To this end a synchronizing signal comprising horizontal synchronizing, vertical synchronizing and equalizing signals are sent with the picture components of the television transmission.

According to present-day standards, the horizontal synchronizing signal comprises pulses periodically recurrent at a rate of 15,750 cycles per second. The vertical synchronizing signal comprises a group of six pulses periodically recurrent at a rate of 60 cycles per second. The equalizing signal comprises a group of twelve pulses, six immediately preceding a group of vertical pulses and six pulses immediately following the vertical pulses, periodically recurrent at a rate of 60 cycles per second.

In order to obtain proper operation of the receiving apparatus it is essential for the synchronizing pulses and the equalizing pulses to be accurately controlled in duration and time of occurrence. To this end it has been proposed to generate all of the above three components of the synchronizing signal from a single generator, for example, from a single relaxation type oscillator having two stable states of equilibrium. Suitable triggering or actuating pulses are applied to the generator to switch from one stable state to the other and back, thereby developing current pulses in the output circuit of the generator of accurately controlled time of occurrence and duration.

Since the duration and periodicity of the horizontal synchronizing, the vertical synchronizing and the equalizing pulses are different, it is necessary to apply different triggering pulses to the aforementioned generator to develop different components of the complete synchronizing signal. The present invention is particularly, though not exclusively, addressed to the problem of generation of signals generally termed in the art as "gating signals" to control the application of the above-referred-to triggering pulses to the aforementioned synchronizing signal generator.

It is an object of the present invention to provide improvements in synchronizing signal generation apparatus.

It is another object of the present invention to provide improvements in apparatus for developing synchronizing signals which are in accurate time relationship to one another.

It is still another object of the present invention to provide reliable and versatile apparatus for the generation of accurately timed gating pulses for particular use in synchronizing signal generation.

It is a further object of the present invention to provide simple yet effective and reliable apparatus requiring a minimum of adjustments for developing pulses of accurately controlled duration and occurrence.

It is a general object of the present invention to provide improvements in signal generation apparatus.

Figure 1:
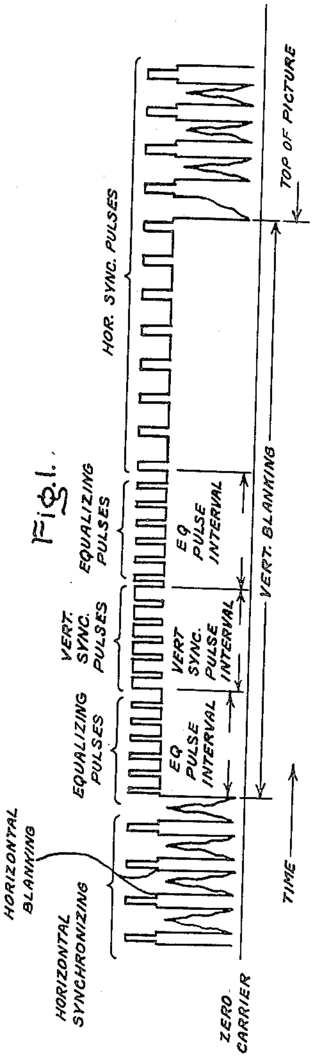
Figure 3:
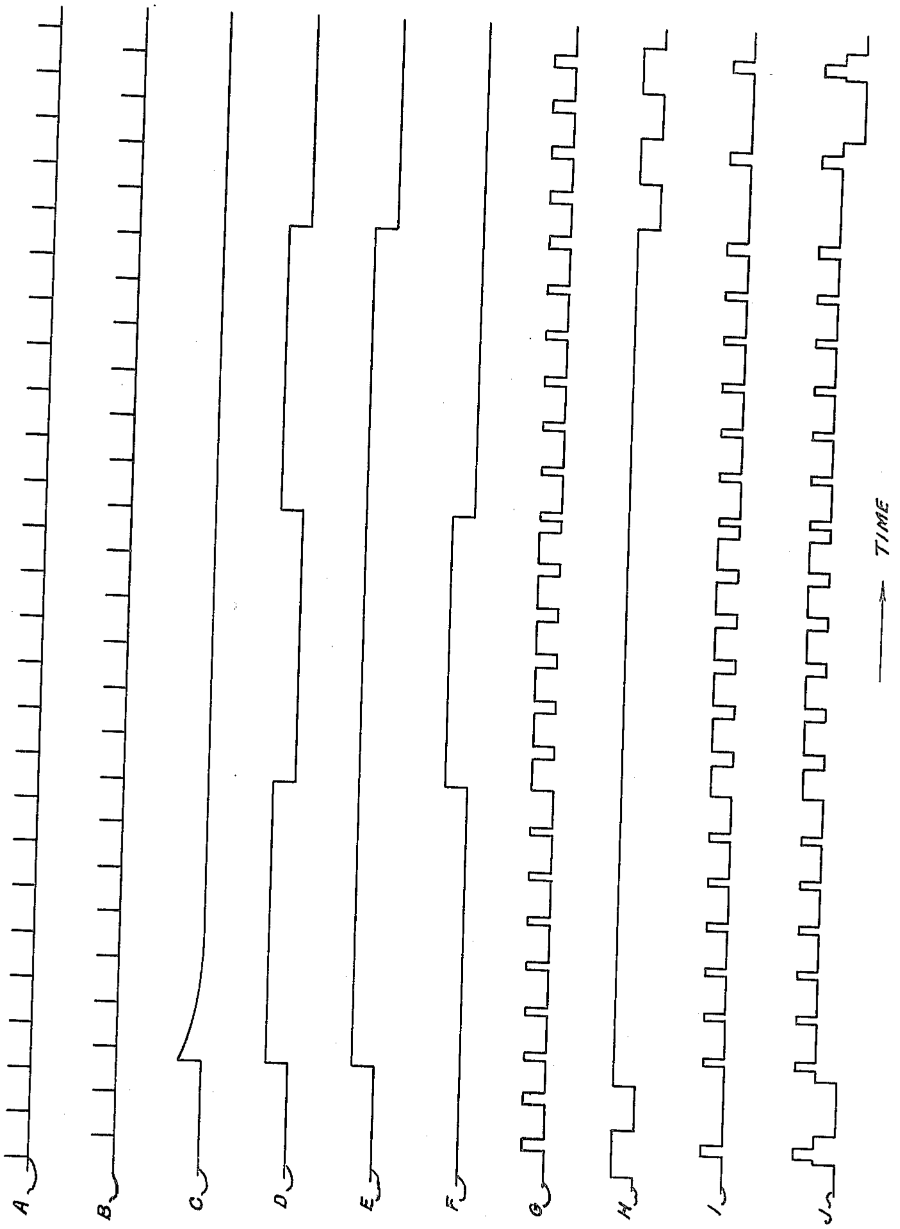
Figures 4, 5:
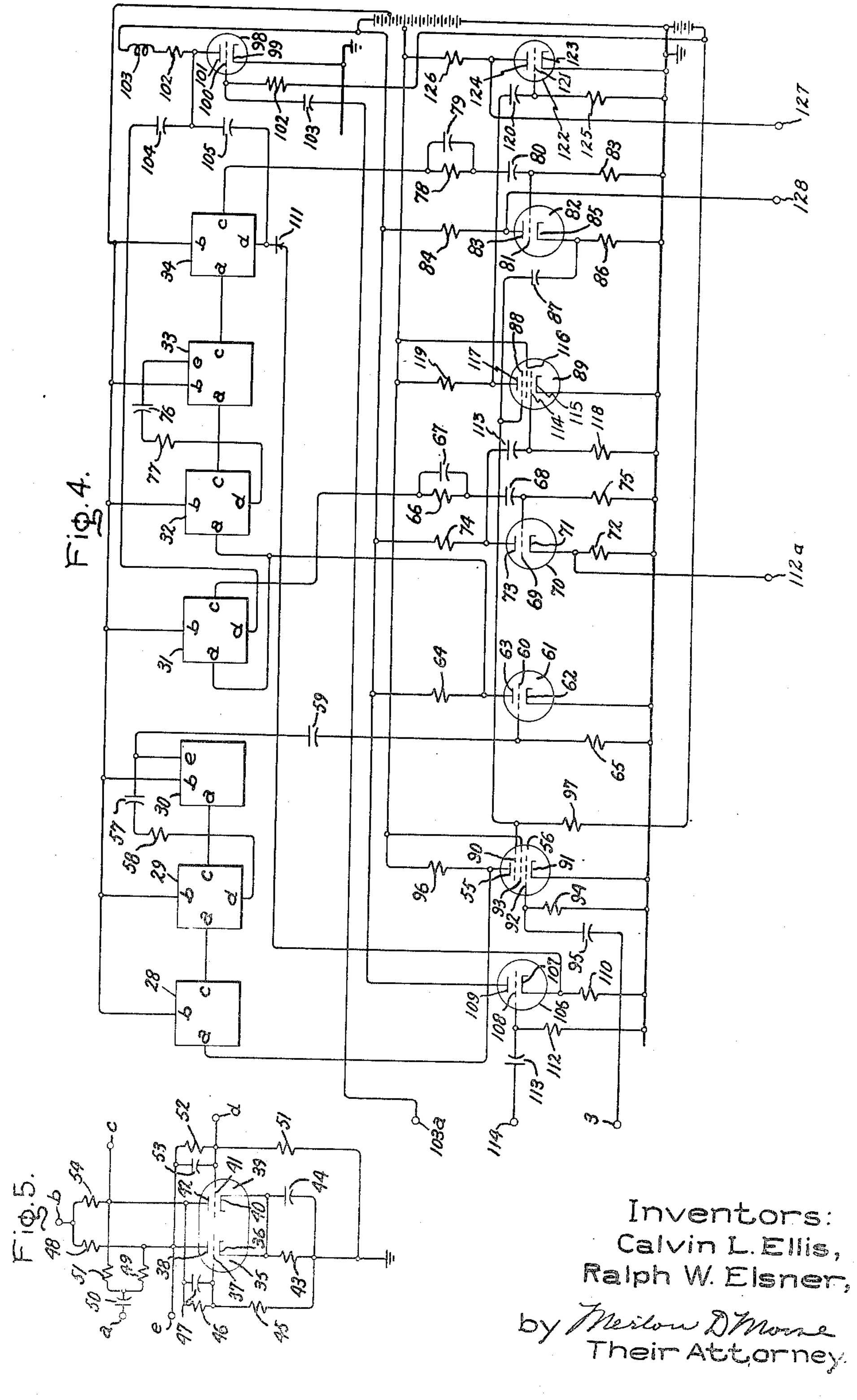

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawings in which Fig. 1 shows a diagram of a standard television signal showing the duration and time of occurrence of the horizontal synchronizing, the vertical synchronizing and the equalizing pulses; Fig. 2 is a block or line diagram showing our invention; Fig. 3 is a diagram of wave forms useful in explaining our invention; Fig. 4 is a schematic diagram of a portion of the circuits shown in the block diagram of Fig. 2.

Referring now to Fig. 1, there is shown a portion of a standard television signal of the kind which modulates the television transmitter and which is detected by a television receiver. The pulses labeled "horizontal synchronizing pulses" function to synchronize the horizontal motion of the beam of the cathode ray tube at the receiver with the electron beam of the iconoscope or some other similar camera device at the transmitter station. The group of pulses labeled "vertical synchronizing pulse" functions to maintain the vertical motion of the electron beam at the receiver in synchronism with the vertical motion electron beam at the transmitter station. The group of pulses labeled "equalizing pulses" function to provide a transition region between vertical synchronizing pulses and the horizontal synchronizing pulses so that the horizontal synchronizing and vertical synchronizing pulses can be effectively segregated at the receiver to perform their above-referred-to functions.

For proper operation of television systems it is essential that the duration and time of occurrence of each of the aforementioned groups of pulses be accurately controlled. The provision of apparatus to achieve this objective is a particular object of the present invention.

The portion of the signal labeled "horizontal blanking" functions to nullify the effect of the electron beam of the cathode ray tube on the screen thereof during the return of the beam after a horizontal scansion. The portion of the signal labeled "vertical blanking" functions to nullify the effect of the electron beam of the cathode ray tube on the screen thereof during the return of the beam after a vertical scansion. The portion of the signal labeled "video" represents variations in intensity and functions to produce variations in light intensity on the screen of the cathode ray tube during the horizontal scansion of the electron beam. The aggregate effect of the variations in light intensity produced on the screen due to the progressive and periodic scansion by the electron beam is a television picture.

Referring now to Fig. 2, there is shown apparatus in block form for the generation of the horizontal synchronizing, vertical synchronizing and equalizing pulses referred to above. This apparatus comprises a delay line 1 having an input terminal 2 and output terminals 3, 4, 5, 6 and 7. The signals applied to terminal 2 may be recovered at the output contacts of the delay line; however, they will be delayed in time by predetermined intervals. Contact 3 of the delay line is connected to the input circuit of amplifier 8, the output circuit of which is connected to the input circuit of counter 9. Counter 9 develops in its output circuit an impulse for every six pulses applied to its input circuit. The output circuit of counter 9 is connected to the input circuit of counter amplifier 10. The output circuit of counter amplifier 10 is connected to both the input circuit of counter 11 and the input circuit of counter 12.

Counter 11 is a heavily biased relaxation type oscillator which has two stable conductive states. Application of pulses to the input circuit of the counter 11 will cause the counter to change from one conductive state to another. Counter 12 is a device which functions to develop in the output circuit a single impulse for every three pulses applied to its input circuit. The output circuit of counter 12 is connected to the input circuit of counter 13. Counter 13 is a heavily biased relaxation type oscillator having two stable conductive states. Application of pulses to the input circuit of counter 13 will cause the counter to change from one state of equilibrium to the other state of equilibrium.

The output circuit of counter 13 is connected to the input circuit of amplifier 14. The output circuit of the amplifier 14 is connected to a current control electrode on amplifier 8. The connection from the output circuit of amplifier 14 to the current control electrode of amplifier 8 is arranged so that only during a particular conductive state of counter 13 does amplifier 8 pass signals which are applied to its input circuit. The input circuits of counter 11 and counter 13 are also connected to the output circuit of amplifier 15, to the input circuit of which may be applied a periodic pulse signal.

The operation of the circuit combination of Fig. 2 described above will be understood by referring to Fig. 3 where are shown graphs of signals appearing at various points in the circuits of Fig. 2. Signals having the waveforms shown in the graphs appear at points in the circuit of Fig. 2 having the same literal designation as the graphs. The abscissas of the graphs represent time and the ordinates of the graphs represent voltage amplitude of the signals. Short pulses of twice horizontal line scanning frequency as shown in graph A are applied at terminal 2 of delay line 1 from a suitable source. Pulses appearing at terminal 3 are slightly delayed in time by delay line 1 as is apparent by referring to graph B. These pulses are applied to the input of amplifier 8. A pulse corresponding to the leading edge of the vertical blanking signal is simultaneously applied to the input circuit of amplifier 15 as shown in graph C. Since the output circuit of amplifier 15 is connected to the input circuit of counters 11 and 13, counter 11 is caused to change from one conductive state to another, as illustrated in graph D. Likewise, counter 13 is caused to change from one conductive state to another as shown in graph E. The change in conductive state of counter 13 is applied through amplifier 14 to the current control electrode of amplifier 8 causing the latter to pass the aforementioned pulses applied to its input circuit to the output circuit thereof.

After the occurrence of six pulses, counter 9 supplies a pulse through the counter amplifier 10 to the counter 11 causing the latter to again change its conductive state as shown in graph D. After the passage of six more pulses through the amplifier 8, the counter 9 again executes a complete cycle and supplies another pulse to the counter 11 causing it to again change its conductive state, as shown in graph D. After the passage of a third group of six pulses through the amplifier 8, the counter 9 again executes a complete cycle and supplies a pulse to the counter 11 causing it again to change its conductive state as shown in graph D.

The eighteen pulses passed through amplifier 8 cause the appearance of three pulses at the output circuit of counter 9 which are supplied to counter 12 causing the latter to execute a complete cycle and supply a single pulse to the counter 13 which again changes its conductive state as shown in graph E. This latter change is applied through amplifier 14 to the bias electrode of amplifier 8 to block passage of further pulses therethrough until the next cycle of operation of the counter chain initiated by the pulse applied to amplifier 15.

Thus, it is seen that from the output circuit of counter 11 is obtained a signal having a waveform of the kind shown in graph D and from the output circuit of counter 13 a signal having the waveform of the kind shown in graph E is obtained.

The signals represented by graphs D and E may be combined. The signal of graph D is applied through amplifier 16 to one control electrode of mixer device 17. The signal of graph E is applied to another control electrode of mixer device 17. From the output circuit of mixer device 17 is obtained a signal having the waveform shown in graph F. The signals represented by graphs D, E and F are used in a manner to be described below in the generation of the horizontal synchronizing, the vertical synchronizing and the equalizing pulses.

When A. C. coupling is used between counter 13 and amplifier 8, a given conductive condition in counter 13 will not always coincide with the biasing or unbiasing of amplifier 8 which is required for the proper operation of the counter chain described above. To assure this result, a positive pulse corresponding to the trailing edge of the vertical blanking pulse is applied through amplifier 18 to the binary counter 13 so that in operation of the counter chain counter 13 always starts from a predetermined condition of operation.

Continuing now with the description of the circuit of Fig. 2 terminal 4 of delay line 1 is connected to the input circuit of amplifier 19. The output circuit of amplifier 19 is connected to the start terminal 20 of synchronizing signal generator 21. Generator 21 may be a relaxation-type oscillator having two stable conductive states. This type of generator is referred to in the art as a bi-stable multivibrator. Terminal 5 of delay line 1 is connected to the input circuit of amplifier 22. The output circuit of amplifier 22 is connected to stop terminal 23 of multigenerator 21. Terminal 6 of delay line 1 is connected to the input circuit of amplifier 24, the output circuit of which is connected to terminal 23 of generator 21. Terminal 7 of delay line 1 is connected to the input circuit of amplifier 25, the output circuit of which is connected to terminal 23 of generator 21.

The application of a pulse to start terminal 20 of generator 21 causes current conduction in the output circuit thereof and on the application of a pulse to stop terminal 23, the current conduction ceases. Thus, the time of occurrence of a pulse of current in the output circuit of the multivibrator 21 may be controlled by the time of occurrence of the pulses applied to terminal 20. The duration of the pulse of current is controlled by the interval between the pulses applied to the start terminal 20 and stop terminal 23.

The pulses applied to the generator 21 from terminal 4 of delay line 1 are of twice horizontal line scanning frequency. Accordingly, the pulses developed in the output circuit of multivibrator 21 are also of twice line frequency.

The output circuit of amplifier 14 is connected to a control point on amplifier 24 whereby amplifier 24 is rendered non-conductive during the interval represented by the signal of graph E. The output circuit of mixer device 17 is connected to a phase inverter stage 26. The output circuit of the phase inverter 26 is connected to a bias electrode on amplifier 25 permitting the amplifier 25 to be conductive only during the occurrence of the signal represented by graph F. Amplifier 16 is connected to a control point on amplifier 22 whereby amplifier 22 is rendered conductive only during the occurrence of the positive portions of the signal represented by graph D.

Pulses of twice horizontal line scanning frequency are applied through amplifier 19 to point 20 of multivibrator 21 to establish in the output circuit of multivibrator 21 the leading edges of pulses of twice line frequency. Since amplifier 24 is conductive all the time except for a period represented by substantially nine successive horizontal scanning lines corresponding to the width of the pulse obtained from amplifier 14, trailing edges of the pulses from the multivibrator 21 are established by these pulses, except during this 9H interval, 9H referring to an interval substantially nine horizontal scanning lines in duration. The width of the pulses of this first group has the width of the horizontal synchronizing pulses of the synchronizing signal.

Since amplifier 25 is conductive only during the interval corresponding to substantially three horizontal scanning lines represented by the signal in graph F, the trailing edges of a second group of pulses centrally located in the above referred to 9H interval and having a duration corresponding to the delay between terminal 4 and terminal 7 of delay line 1, is established. This group of pulses constitutes the vertical synchronizing signal.

Since amplifier 22 is conductive during the remainder of the 9H interval, the trailing edges of this third group of pulses are established by triggering pulses obtained through this amplifier. The width of this group of pulses corresponds to the delay between terminals 4 and 5 of the delay line. This latter group of pulses corresponds to the equalizing pulses of the synchronizing signal. It is thus seen that at the output terminal of multivibrator 21 a signal having waveform of the kind shown in graph G is obtained.

The output from the multivibrator 21 is applied to a gating amplifier 27. A signal having a waveform of the kind shown in graph H is also applied to amplifier 27. The signal of the waveform shown in graph I is obtained from the output circuit of the amplifier 27. Amplifier 27 thus functions to delete alternate horizontal synchronizing pulses and thereby form the complete synchronizing signal.

The waveform I is combined with the horizontal and vertical blanking signals to obtain the complete television signal without the video component as shown in graph J.

Referring now to Fig. 4, there is shown a schematic diagram of a portion of the apparatus shown in the block diagram of Fig. 2. Referring now particularly to the upper portion of this drawing, there is shown a counter chain comprising elements 28, 29, 30, 31, 32, 33 and 34. Elements 28, 29 and 30 correspond to the counter 9 of block diagram 2. Element 31 corresponds to counter 11 of block diagram 2. Elements 32 and 33 correspond to counter 12 of block diagram 2. Element 34 corresponds to counter 13 of block diagram 2. The circuit combination represented by each of the blocks 28, 29, 30, 31, 32, 33 and 34 are all identical and are shown in detail in Fig. 5. The terminals of each of these elements correspond to the terminals in Fig. 5 having the same literal designations.

Referring now to Fig. 5, there is shown a circuit combination comprising a first electron discharge device 35, having a cathode 36, a grid 37, and an anode 38, and a second electron discharge device 39 having a cathode 40, grid 41, and an anode 42. The cathodes 36 and 40 are connected to one end of cathode bias resistor 43, the other end of which is connected to ground. Resistor 43 is bypassed by capacitor 44. Grid 37 is connected through grid resistance 45 to ground. Grid 37 is also connected through a parallel combination of resistance 46 and capacitance 47 to anode 42. The anode 38 is connected through anode resistance 48 to the positive terminal of the power supply. Anode 38 is also connected through a coupling resistance 49 and through coupling capacitor 50 to pulse input terminal a. The anode 38 is further connected to feed-back terminal *e*. The grid 41 is connected through grid resistance 51 to ground. The grid 41 is also connected through a parallel combination of resistance 52 and capacitance 53 to anode 38. Grid 41 is further connected to input terminal *d*. The anode 42 is connected through anode resistance 54 to the positive terminal of the power supply. Anode 42 is also connected through a coupling resistance 51 to the common connection of capacitors 49 and 50. Anode 42 is further connected to output terminal *c*. The positive terminal of the power supply is terminal *b*.

The circuit combination described in the preceding paragraph is referred to in the art as a heavily biased relaxation oscillator with two stable conditions of operation, i. e., the current flowing through one of the above referred-to devices changes abruptly from one value to a second value when the circuit combination is suitably triggered or actuated by a negative pulse applied at input terminal *a*. With regard to the manner of operation of the above circuit combination, assume that device 39 is conducting. A negative triggering pulse applied at terminal *a* is coupled to the grid 41 through resistance 52 and capacitance 53, and lowers the potential of this grid. The lowering of potential of grid 41 causes a reduction in conduction of device 39, thereby causing the anode potential of device 39 to rise. The negative pulse applied to terminal *a* has no effect on device 35, since grid 37 of device 35 is already biased negatively by the voltage drop across cathode resistance 43. The rise in potential at the anode 42 is applied to the grid 37 through the parallel combination of resistance 46 and capacitor 47, causing the device 35 to start conducting. The current conduction through device 35 causes a reduction in the potential at the anode 38. A reduction of the potential at anode 38 causes grid 41 to further drop in potential to further reduce conduction in device 39.' This positive feedback action causes the device 39 to become non-conductive, and the device 35 to be conductive, in an extremely rapid time. If now another negative triggering pulse is applied to terminal *a*, the reverse action would take place, leaving device 35 non-conductive and device 39 conductive.

Referring now again to Fig. 4, terminal *a* of element 28 is connected to the anode 55 of electron discharge device 56. Terminal *b* of element 28 is connected to the positive terminal of the power supply. Terminal *c* of device 28 is connected to terminal *a* of element 29. Terminal *b* of element 29 is connected to the positive terminal of the power supply. Terminal *c* of element 29 is connected to the terminal *a* of device 30. Terminal *b* of element 30 is connected to the positive terminal of the power supply. Terminal *c* of element 30 is connected through a series network comprising capacitance 57 and resistance 58, to terminal *d* of element 29. Elements 28, 29 and 30 together correspond to the block 9 of Fig. 2.

Terminal 30*e* is connected to grid 60 of electron discharge device 61 through coupling capacitor 59. Device 61 includes cathode 62 connected to ground and anode 63 connected to the positive terminal of the power supply through load resistance 64. The grid 60 is also connected to ground through grid resistance 65. The anode 63 is connected to terminals 32*a* and 31*a*.

Element 31 corresponds to block 11 of Fig. 2. Elements 32 and 33 correspond to block 12 of Fig. 2. Element 34 corresponds to block 13 of Fig. 2. Terminals 31*b*, 32*b*, 33*b*, 34*b* are connected to the positive terminal of the power supply. Terminal 31*c* is connected through a parallel combination of resistance 66 and capacitance 67 in series with a capacitance 68 to grid 69 of electron discharge device 70. Electron discharge device 70 includes a cathode 71 connected to ground through resistance 72 and anode 73 connected through anode load resistance 74 to the positive terminal of the power supply. The grid 69 is also connected through grid resistance 75 to ground. Terminal 32*c* is connected to terminal 33*a*. Terminal 33*e* is connected through a series network of capacitance 76 and resistance 77 to terminal 32*e*. Terminal 33*c* is connected to terminal 34*a*. Terminal 34*c* is connected through a parallel network of resistance 78 and capacitance 79 in series with coupling capacitor 80 to grid 81 of electron discharge device 82. Grid 81 is also connected through grid resistance 83 to ground. The anode 83 of electron discharge device 82 is connected through anode load resistance 84 to the positive terminal of the power supply. The cathode 85 of electron discharge device 82 is connected through cathode load resistance 86 to ground. Cathode 85 is also connected through coupling capacitance 87 to grid 88 of device 89, and to control grid 90 of device 56. Device 56 is an electron discharge device having a cathode 91, a grid 92, a screen grid 93, a second control grid 90, and an anode 55. Cathode 91 is connected to ground. The grid 92 is connected to grid resistance 94 to ground. Grid 92 is also connected through coupling capacitance 95 to terminal 3 on delay line 1 of Fig. 2. The screen grid 93 is connected to a positive point on the power supply. The anode 55 is connected through anode load resistance 96 to a positive point on the power supply. As pointed out above, anode 55 also is connected to terminal 28*a*. Amplifier 56 functions to supply the pulses from terminal 3 of the delay line to terminal 28*a*. Terminal 90 is also connected through resistance 97 to a negative point on the power supply. In the absence of an actuating potential on electrode 90 from device 82, the device 56 is non-conductive. Accordingly, in the absence of an unbiasing signal on grid 90, pulses applied at terminal 3 do not reach terminal 28*a*.

Device 98 in the upper right-hand corner of the drawing corresponds to block 15 of Fig. 2, and comprises cathode 99, grid 100, anode 101. Cathode 99 is connected to ground. Grid 100 is connected through grid resistance 102 to a negative point on the power supply. Grid 100 is also connected through capacitance 103 to terminal 103*a* to which may be applied positive pulses corresponding to the leading edges of the vertical blanking signal. The anode 101 is connected through anode load resistance 102 and inductance 103 to the positive terminal of the power supply. The anode 101 is connected through coupling capacitor 104 to terminal 31*d*. Anode 101 is also connected through coupling capacitor 105 to terminal 34*d*.

Referring now to the operation of the circuits described above, at the beginning of the cycle of the counter chain comprising elements 28, 29, 31, 32, 33 and 34, the potentials at terminals 28*c*, 29*c*, 31*c*, 32*c*, 33*c*, 34*c* are at the lower of the two potentials that these terminals can assume and which corresponds to the two stable states of these elements as pointed out in connection with the descripition of Fig. 5. The potential at terminal 30e will be at the higher of the two potentials this terminal can assume. The application of a positive pulse corresponding to the leading edge of the vertical blanking signal to terminal 103a initiates the cycle of operation of the counter chain. The positive pulse appearing at grid 100 causes a negative pulse to appear at the anode 101. This negative pulse is applied to terminals 31d and 34d, causing terminals 31c and 34c to rise in potential. The rise in potential at terminal 34c is applied to decoupling network comprising capacitor 79, resistance 78 and capacitor 80, causing a rise in potential to appear at grid 81. The rise in potential at cathode 85 due to the rise in potential of grid 81 of device 82 is coupled through capacitance 87 to bias electrode 90 of device 56, causing device 56 to become conductive. The twice horizontal line scansion frequency pulses applied at terminal 3 are thus allowed to pass through the device 56 and appear at terminal 28a.

With respect to the operation of elements 28, 29 and 30, the negative pulse applied at terminal 28a causes the potential at terminal 28c to rise, as is readily apparent from a consideration of the explanation of the circuit combination of Fig. 5. The rise in potential at the terminal 28c has no effect on element 29 since element 29 is responsive only to negative-going signals. Upon the application of a second pulse at terminal 28a potential at terminal 28c drops. This drop in potential applied to terminal 29a causes the potential at terminal 29c to rise. On the application of a third pulse to terminal 28a, the potential at terminal 28c again rises, but has no effect on element 29. On the application of a fourth pulse to terminal 28a, the potential at terminal 28c drops, thereby causing a drop in potential at terminal 29c. The drop in potential at terminal 29c is applied to terminal 30a, causing the potential at terminal 30e to drop. This drop in potential is applied through delay network comprising resistance 58 and capacitance 57 to terminal 29d, causing the potential at terminal 29c to rise again. Upon the application of two more pulses to terminal 28a, the potential at terminal 29c again falls, causing the potential at terminal 30e to rise. Thus, it is seen that the circuit arrangement comprising elements 28, 29 and 30 functions to develop at output terminal 30e a positive pulse for every six negative pulses applied to terminal 28a.

The negative pulse appearing at terminal 30e is inverted by the device 61, wherein it appears as a positive pulse at anode 63. Accordingly, the trailing edge of this pulse is a negative-going edge which, when applied to terminal 31a, causes the terminal 31c to fall in potential, as is apparent from a consideration of graph D of Fig. 3. Upon the occurrence of six more pulses at terminal 28a, the counter comprising elements 28, 29, 30, again executes a complete cycle and causes the potential at terminal 31c to rise as is apparent from graph D of Fig. 3. On the occurrence of a third set of six pulses at terminal 28a, the counter comprising elements 28, 29, 30 again executes a complete cycle, causing the potential at terminal 31c to again fall, as shown in graph D. The lagging edges of the three pulses appearing at the anode 63 due to the application of eighteen pulses to terminal 28a, causes the counter comprising elements 32 and 33 to execute a complete cycle, causing the terminal 33c to rise in potential on the occurrence of the twelfth pulse in the series of eighteen pulses and then fall in potential after the end of the eighteenth pulse in a mode of operation similar to the mode of operation of the counter comprising elements 28, 29 and 30. The fall in potential of point 33c is applied to terminal 34a and causes the potential of point 34c to fall, as shown in graph E of Fig. 3. It will be recalled that at the start of the cycle of operation of the counter chain, the potential of terminal 34c rose and now at the occurrence of the eighteenth pulse, the potential at this point dropped, thereby producing a positive pulse which when applied to control electrode 90 of device 56 renders amplifier 56 non-conductive and blocks the passage of pulses from terminal 3 to terminal 28a until the next cycle initiated by application of a pulse at terminal 103a.

Since A.-C. coupling is used from terminal 34c to control electrode 90 of device 56, and since it is essential that a particular conductive condition at terminal 34c coincide with the unbiasing of amplifier 56, i. e., in order to insure that the apparatus starts in step, a pulse is supplied to terminal 34d to cause element 34 to assume a particular conductive state, so that when the negative pulse corresponding to the leading edge of the vertical blanking signal is applied to terminal 34d, the change in potential at terminal 34c applied to grid 90 through cathode follower 82 unblocks device 56. Thus in the subsequent operation of the counterchain, whenever terminal 34c is at its positive, or at the higher in potential of its two conductive conditions, amplifier 56 is unblocked. To this end is provided electron discharge device 106 having a cathode 107, a grid 108, and an anode 109. The cathode is connected to ground through resistance 110. The cathode is also connected to the positive pole of the unilaterally conducting device 111. The negative pole of the unilaterally conducting device is connected to terminal 34d. The grid 108 is connected through resistance 112 to ground. The grid is also connected through coupling capacitor 113 to terminal 114, to which may be applied positive signals corresponding to the trailing edge of the vertical blanking signal. The anode 109 is connected to the positive terminal of the power supply.

Terminal 34d is at a higher potential than cathode 107 of device 106 in the absence of an applied positive signal to device 106. Accordingly unilateral conducting device 111 functions to disconnect terminal 34d from cathode 107 except during the application of a positive pulse to grid 108. The application of a positive pulse to grid 108 causes the potential of cathode 107 to rise above the potential of terminal 34d thereby actuating element 34d to change from one conductive state to another.

The positive pulses applied at terminal 114 may have the same periodicity as the vertical blanking signal and may be derived from the trailing edges thereof.

Output terminal 112a on which appears a signal of the kind shown in graph D of Fig. 3 is connected to cathode 71 of device 70 and corresponds to terminal 112a of amplifier 22 of Fig. 2.

The anode 73 of device 70 is connected through coupling capacitor 113 to control grid 114 of device 89 which also includes cathode 115, screen grid 116, a second control grid 88 and an anode 117. Grid 114 is connected through grid resistance 118 to ground. Cathode 89 is connected to ground. Screen grid 115 is connected to a positive point on the power supply. Control grid 88 is connected to cathode 85 of device 82 through capacitor 87. Anode 117 is connected through anode resistance 119 to a positive point on the power supply. Anode 117 is connected through coupling capacitor 120 to grid 121 of device 122 which also includes cathode 123 and anode 124. Grid 121 is also connected through grid resistance 125 to ground. Cathode 123 is connected to ground. Anode 124 is connected through anode resistance 126 to a positive point on the power supply. Since a signal of the form shown in graph D of Fig. 3 but reversed in polarity appears on grid 114 and a signal of the form shown in graph E of Fig. 3 appears on control grid 88, a signal of the form shown in graph F of Fig. 3 but reversed in polarity appears at anode 117. This pulse applied to inverter device 122 develops a signal of the form shown in graph F of Fig. 3 at anode 124 of device 122. Output terminal 127 is connected to anode 124 and corresponds to terminal 127 of amplifier 25 of Fig. 2.

Output terminal 128 on which appears a signal of the form shown in graph E of Fig. 3 but reversed in polarity is connected to anode 83 of device 82 and corresponds to terminal 128 of amplifier 24 of Fig. 2.

While we have shown a particular embodiment of our invention, it will of course be understood that we do not wish to be limited thereto since many modifications, both in the circuit arrangement and in the instrumentalities employed, may be made, and we therefore, contemplate by the appended claims to cover any such modifications as fall within the true spirit and scope of our invention.

What we claim as new and desire to secure by Letters Patent of the United States is:

1. Apparatus for developing groups of signals of accurately controlled occurrence with respect to one another and of accurately controlled durations, comprising a first counter means having an input circuit and an output circuit and arranged to develop a single impulse in said output circuit for a predetermined number of impulses supplied to said input circuit, a second counter means having an input circuit and an output circuit, current conduction in the output circuit of said second counter means being changeable from one value to another upon the application of an impulse to its input circuit, the input circuit of said second counter means connected to the output circuit of said first counter means, a third counter means having an input circuit and an output circuit and arranged to develop a single impulse in said output circuit for a predetermined number of impulses supplied to said input circuit, the input circuit of said third counter means connected to the output circuit of said first counter means, a fourth counter means having an input circuit and an output circuit, current conduction in the output circuit of said fourth counter means being changeable from one value to another upon the application of an impulse to its input circuit, the input circuit of said fourth counter means connected to the output circuit of said third counter means, switching means having an input circuit connected to a source of recurring series of electrical pulses of short duration and an output circuit connected to the input circuit of said first counter means and a control circuit connected to the output circuit of said fourth counter means for allowing the passage of said series of electrical pulses to said first counter means during the occurrence of a particular conductive state in the output circuit of said fourth counter means, means for supplying a second series of pulses having a lower frequency than said first-mentioned series of pulses to the input circuits of said second and fourth counter means, whereby groups of pulses are developed in the output circuits of the second and fourth counter means, having a frequency of occurrence determined by the frequency of occurrence of the pulses of said second series of pulses, the duration of a pulse of the group appearing in the output circuit of the second counter means being determined by the time required for the first counter means to execute a complete cycle, the duration of a pulse of the group appearing in the output circuit of the fourth counter means being determined by the product of the time required for the first counter means to execute a complete cycle by the time required for the third counter means to execute a complete cycle.

2. Apparatus for developing groups of signals of accurately controlled occurrence with respect to one another and of accurately controlled duration comprising a first counter means having an input circuit and an output circuit and arranged to develop a single impulse in said output circuit for a predetermined number of impulses supplied to said input circuit, a second counter means having an input circuit and an output circuit, current conduction in the output circuit of said second counter means being changeable from one value to another upon the application of an impulse to its input circuit, the input circuit of said second counter means connected to the output circuit of said first counter means, a third counter means having an input circuit and an output circuit and arranged to develop a single impulse in said output circuit for a predetermined number of impulses supplied to said input circuit, the input circuit of said third counter means connected to the output circuit of said first counter means, a fourth counter means having an input circuit and an output circuit, current conduction in the output circuit of said fourth counter means being changeable from one value to another on the application of an impulse to its input circuit, the input circuit of said fourth counter means connected to the output circuit of said third counter means, a fifth counter means having an input circuit and an output circuit and arranged to develop a single impulse in its output circuit for a predetermined number of impulses supplied to its input circuit, the input circuit of said fifth counter means connected to the output circuit of said fourth counter means, a sixth counter means having an input circuit and an output circuit, current conduction in the output circuit of said sixth counter means being changeable from one value to another on the application of an impulse to its input circuit, the input circuit of said sixth counter means connected to the output circuit of said fifth counter means, switching means having an input circuit connected to a source of recurring electrical pulses of short duration and an output circuit connected to the input circuit of said first counter means and a control circuit connected to the output circuit of said sixth means for allowing the passage of said series of electrical pulses to said first counter means during the occurrence of a particular conductive state in the output circuit of said sixth counter means, means for supplying a second series of pulses having a lower frequency than said first-mentioned series of pulses to the input circuits of said second, fourth and sixth counter means whereby groups of pulses are developed in the output circuits of said second, fourth and sixth counter means having a frequency of occurrence determined by the frequency of occurrence of the pulses of said second series, and having durations dependent on the times required for the first, third and fifth counter means to execute complete cycles.

3. Apparatus for developing groups of signals of accurately controlled occurrence with respect to one another and of accurately controlled durations comprising a first counter means having an input circuit and an output circuit and arranged to develop a single impulse in said output circuit for a predetermined number of impulses supplied to said input circuit, a second counter means having an input circuit and an output circuit, current conduction in the output circuit of said second counter means being changeable from one value to another upon the application of an impulse to its input circuit, the input circuit of said second counter means connected to the output circuit of said first counter means through an amplifier, a third counter means having an input circuit and an output circuit, and arranged to develop a single impulse in said output circuit for a predetermined number of impulses supplied to said input circuit, the input circuit of said third counter means connected to the output circuit of said amplifier, a fourth counter means having an input circuit and an output circuit, current conduction in the output circuit of said fourth counter means being changeable from one value to another upon the application of an impulse to its input circuit, the input circuit of said fourth counter means connected to the output circuit of said third counter means, an amplifier means having an input circuit connected to a source of recurring series of electrical pulses of short duration and an output circuit connected to the input circuit of said first counter means and having a control circuit connected to the output circuit of a third amplifier, the input circuit of said third amplifier connected to the output circuit of said fourth counter means for allowing the passage of a series of electrical pulses to said first counter means during the occurrence of a particular conductive state in the output circuit of said fourth counter means, means for supplying a second series of pulses having a lower frequency than said first-mentioned series of pulses to said second and fourth counter means, whereby groups of pulses are developed in the output circuits of said second and fourth counter means, having a frequency of occurrence determined by the frequency of occurrence of the pulses of said second series and having a duration dependent on the time required for the first and third counter means to execute complete cycles.

4. Apparatus for developing groups of signals of accurately controlled occurrence with respect to one another and of accurately controlled durations comprising a first counter means having an input circuit and an output circuit and arranged to develop a single impulse in said output circuit for a predetermined number of impulses supplied to said input circuit, a second counter means having an input circuit and an output circuit, current conduction in the output circuit of said second counter means being changeable from one value to another upon the application of an impulse to its input circuit, the input circuit of said second counter means connected to the output circuit of said first counter means through an amplifier, a third counter means having an input circuit and an output circuit, and arranged to develop a single impulse in said output circuit for a predetermined number of impulses supplied to said input circuit, the input circuit of said third counter means connected to the output circuit of said amplifier, a fourth counter means having an input circuit and an output circuit, current conduction in the output circuit of said fourth counter means being changeable from one value to another upon the application of an impulse to its input circuit, the input circuit of said fourth counter means connected to the output circuit of said third counter means, an amplifier means having an input circuit connected to a source of recurring series of electrical pulses of short duration and an output circuit connected to the input circuit of said first counter means and having a control circuit connected to the output circuit of a third amplifier, the input circuit of said third amplifier connected to the output circuit of said fourth counter means for allowing the passage of series of electrical pulses to said first counter means during the occurrence of a particular conductive state in the output circuit of said fourth counter means, means for supplying a pulse to the input circuit of said fourth counter means prior to the first cycle of operation of said fourth counter means whereby the cycle of operation of said fourth counter means always starts from the same particular conductive state of the output circuit of said fourth counter means, means for supplying a second series of pulses having a lower frequency than said first-mentioned series of pulses to said second and fourth counter means, whereby groups of pulses are developed in the output circuits of said second and fourth counter means, having a frequency of occurrence determined by the frequency of occurrence of the pulses of said second series and having a duration dependent on the time required for the first and third counter means to execute complete cycles.

5. In a television system, apparatus for developing groups of signals of accurately controlled occurrence with respect to one another and of accurately controlled durations comprising a first counter means having an input circuit and an output circuit and arranged to develop a single pulse in said output circuit for every six pulses supplied to said input circuit, a second counter means having an input circuit and an output circuit, current conduction in the output circuit of said second contour means being changeable from one value to another upon the application of a pulse to its input circuit, the input circuit of said second counter means connected to the output circuit of said first counter means through an amplifier, a third counter means having an input circuit and an output circuit, and arranged to develop a single pulse for every three pulses supplied to said input circuit, the input circuit of said third counter means connected to the output circuit of said amplifier, a fourth counter means having an input circuit and an output circuit, current conduction in the output circuit of said fourth contour means being changeable from one value to another upon the application of a pulse to its input circuit, the input circuit of said fourth counter means connected to the output circuit of said third counter means, an amplifier means having an input circuit connected to a source of electrical pulses of short duration regularly recurring at a frequency of twice horizontal line scansion frequency of said television system and an output circuit connected to the input circuit of said first counter means and having a control circuit connected to the output circuit of a third amplifier, the input circuit of said third amplifier connected to the output circuit of said fourth counter means for allowing the passage of said electrical pulses to said first counter means during the occurrence of a particular conductive state in the output circuit of said fourth counter means, means for supplying a second series of pulses having a lower frequency than said first-mentioned series of pulses to said second and fourth counter means, whereby groups of pulses are developed in the output circuits of said second and fourth counter means, having a frequency of occurrence determined by the frequency of occurrence of the pulses of said second series and having a duration dependent on the time required for the first and third counter means to execute complete cycles.

6. In combination, in a system for developing two groups of pulses, the pulses of one group occurring in accurately timed relationship with respect to the pulses of the other of said groups and the pulses of each group having predetermined durations, two sources of recurrent pulses, the pulses of one of said sources having a substantially higher frequency than the pulses of the other of said sources, means responsive to the occurrence of said low frequency pulses and to the occurrence of said high frequency pulses which occur after each of said low frequency pulses for developing impulses, each impulse occurring after the occurrence of a predetermined number of said high frequency pulses, means responsive to said low frequency pulses and to said impulses for developing a group of recurrent pulses, each of said recurrent pulses including a pulse having an occurrence during the time between a low frequency pulse and a succeeding impulse and also including pulses occurring during the time between successive pairs of impulses after said succeeding impulse, means responsive to said impulses for developing a second group of impulses, each of the impulses of said second group occurring after a predetermined number of impulses of said first group, each of said impulses of said second group occurring prior to the occurrence of the respective ones of said low frequency pulses next succeeding the respective ones initiating said impulses, means responsive to each of the impulses of said second group for rendering said first means non-responsive to said high frequency pulses, means responsive to said low frequency pulses and to said second group of impulses for developing a second group of pulses, each of said pulses having an occurrence from the time of occurrence of a low frequency pulse and a succeeding one of said impulses of said control group.

7. In combination, in a system for developing groups of pulses, the pulses of one group occurring in accurately timed relationship with respect to the pulses of the other of said groups and the pulses of each group having predetermined durations, two sources of recurrent pulses, the pulses of one of said sources having a substantially higher frequency than the pulses of the other of said sources, means responsive to the occurrence of said low frequency pulses and to the occurrence of said high frequency pulses which occur after each of said low frequency pulses for developing impulses, each impulse occurring after the occurrence of a predetermined number of said high frequency pulses, means responsive to said low frequency pulses and to said impulses for developing a group of recurrent pulses, each of said recurrent pulses including a pulse having an occurence during the time between a low frequency pulse and a succeeding impulse and also including pulses occurring during the time between successive pairs of impulses after said succeeding impulse, means responsive to said impulses for developing a second group of impulses, each of the impulses of said second group occurring after three of the impulses of said first group, each of said impulses of said second group occurring prior to the occurrence of the respective ones of said low frequency pulses next succeeding the respective ones initiating said impulses, means responsive to each of the impulses of said second group for rendering said first means non-responsive to said high frequency pulses, means responsive to said low frequency pulses and to said second group of impulses for developing a second group of pulses, each of said pulses having an occurrence from the time of occurrence of a low frequency pulse and a succeeding one of said impulses of said second group, means for combining said first and second group of pulses to derive a third group of pulses, each pulse of which occurs during the time between occurrence of the first and second impulse of said first group of impulses.

CALVIN L. ELLIS.
RALPH W. ELSNER.

References Cited in the file of this patent

UNITED STATES PATENTS

| Number | Name | Date |
|---|---|---|
| 2,286,450 | White | June 16, 1942 |
| 2,350,536 | Schlesinger | June 6, 1944 |
| 2,468,256 | Espley | Apr. 26, 1949 |
| 2,515,613 | Schoenfeld | July 18, 1950 |
| 2,516,972 | Bannaway | Aug. 1, 1950 |
| 2,556,933 | Mulligan | June 12, 1951 |
| 2 570,775 | DeBaun | Oct. 9, 1951 |